United States Patent
Stephens et al.

(10) Patent No.: US 10,721,450 B2
(45) Date of Patent: *Jul. 21, 2020

(54) POST PRODUCTION REPLICATION OF OPTICAL PROCESSING FOR DIGITAL CINEMA CAMERAS USING METADATA

(71) Applicants: SONY CORPORATION, Tokyo (JP); SONY PICTURES ENTERTAINMENT INC, Culver City, CA (US)

(72) Inventors: Spencer Stephens, Culver City, CA (US); Chris Cookson, Culver City, CA (US); Scot Barbour, Culver City, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/178,394

(22) Filed: Nov. 1, 2018

(65) Prior Publication Data
US 2019/0075279 A1    Mar. 7, 2019

Related U.S. Application Data

(63) Continuation of application No. 14/284,123, filed on May 21, 2014, now Pat. No. 10,122,982.
(Continued)

(51) Int. Cl.
*H04N 5/77* (2006.01)
*H04N 9/79* (2006.01)
(Continued)

(52) U.S. Cl.
CPC ..... *H04N 9/7904* (2013.01); *G11B 20/10527* (2013.01); *G11B 27/031* (2013.01);
(Continued)

(58) Field of Classification Search
USPC .......................................... 386/223–231, 248
See application file for complete search history.

(56) References Cited

U.S. PATENT DOCUMENTS 6,342,887 B1 *  1/2002  Munroe ................. G06T 15/50
                                                                345/419
7,782,439 B2    8/2010  Bogdanowicz et al.
(Continued)

*Primary Examiner* — Nigar Chowdhury
(74) *Attorney, Agent, or Firm* — Procopio, Cory, Hargreaves & Savitch LLP

(57) ABSTRACT

Recording images, including: receiving an optical effects selection, which indicates a selected optical effect to apply to raw image data capturing the images; receiving an optical effects parameter, which indicates how to apply the selected optical effects to the raw image data; storing the optical effects selection and the optical effects parameter as effects metadata; recording the raw image data using a sensor of the digital camera; marking the effects metadata with time information to associate the effects metadata with the recorded raw image data over time; applying the selected optical effect to the raw image data according to the optical effects parameter to create processed image data while preserving the recorded raw image data; and displaying the processed image data on a display of the digital camera. Key words include raw image data and effects metadata.

20 Claims, 2 Drawing Sheets

Related U.S. Application Data

(60) Provisional application No. 61/825,934, filed on May 21, 2013.

(51) Int. Cl.
| | |
|---|---|
| *H04N 5/765* | (2006.01) |
| *H04N 9/82* | (2006.01) |
| *G11B 20/10* | (2006.01) |
| *G11B 27/031* | (2006.01) |
| *H04N 5/775* | (2006.01) |

(52) U.S. Cl.
CPC .......... *H04N 5/765* (2013.01); *H04N 9/8205* (2013.01); *G11B 2020/10537* (2013.01)

(56) References Cited

U.S. PATENT DOCUMENTS

| | | | |
|---|---|---|---|
| 8,237,864 B2 | 8/2012 | Chung | |
| 8,610,976 B1* | 12/2013 | Cook | G06T 5/50 |
| | | | 358/463 |
| 2006/0153496 A1* | 7/2006 | Tanobe | H04J 14/0227 |
| | | | 385/24 |
| 2007/0120988 A1* | 5/2007 | Akiyama | H04N 5/2254 |
| | | | 348/240.99 |
| 2009/0083282 A1 | 3/2009 | Benitez et al. | |
| 2010/0232704 A1* | 9/2010 | Thorn | G06F 3/04845 |
| | | | 382/195 |
| 2011/0103684 A1* | 5/2011 | Bhatt | G06F 16/51 |
| | | | 382/166 |
| 2012/0110184 A1* | 5/2012 | Uhlhorn | H04L 41/0803 |
| | | | 709/226 |
| 2012/0281960 A1* | 11/2012 | Boncha | H04N 5/772 |
| | | | 386/224 |
| 2013/0235234 A1* | 9/2013 | Cucci | H04N 5/23206 |
| | | | 348/231.99 |
| 2014/0002723 A1* | 1/2014 | Cook | G06T 5/50 |
| | | | 348/370 |

\* cited by examiner

POST PRODUCTION REPLICATION OF OPTICAL PROCESSING FOR DIGITAL CINEMA CAMERAS USING METADATA

CROSS-REFERENCE TO RELATED APPLICATIONS

The present application is a continuation application of co-pending U.S. patent application Ser. No. 14/284,123 (filed May 21, 2014; entitled "Post Production Replication of Optical Processing for Digital Cinema Cameras using Metadata"), which claimed the benefit of priority under 35 U.S.C. § 119(e) of U.S. Provisional Patent Application No. 61/825,934, filed May 21, 2013. The disclosures of the above-referenced patent applications are incorporated herein by reference.

BACKGROUND

Field of the Invention

The present invention relates to digital cinema camera, and more specifically, to post production replication of optical processing for the digital cinema camera.

Background

As technology changes and new formats emerge certain functions that were once done in the camera system can be done in postproduction. For example, existing broadcast high definition cameras have CCD sensors, one sensor for each primary color with an optical splitter dividing up the light between the sensors. For these cameras, the camera functions were "baked in" at the time the content is captured to generate processed image data. Although some systems allow storing of color lookup tables (LUTs) for later processing, these systems use the LUT for color corrections to the already processed image data. Thus, in most cases, the video output of the camera is used as the broadcast or final output of the content.

SUMMARY

The present invention provides for recording images.

In one implementation, a method for recording images is disclosed. The method includes: receiving an optical effects selection through a user interface of a digital camera, wherein the optical effects selection indicates a selected optical effect to apply to raw image data capturing the images; storing the optical effects selection as effects metadata; receiving an optical effects parameter through the user interface, wherein the optical effects parameter indicates how to apply the selected optical effects to the raw image data; storing the optical effects parameter as effects metadata; recording the raw image data using a sensor of the digital camera; marking the effects metadata with time information to associate the effects metadata with the recorded raw image data over time; applying the selected optical effect to the raw image data according to the optical effects parameter to create processed image data while preserving the recorded raw image data; and displaying the processed image data on a display of the digital camera.

In another implementation, a digital cinema camera for recording images is disclosed. The cinema camera includes: an effects sensor configured to capture an optical effects of the digital cinema camera, wherein the optical effects are applied to raw image data capturing the images; a processor configured to receive an optical effects parameter, wherein the optical effects parameter indicates how to apply the optical effects to the raw image data; an optical effects data storage unit to store the optical effects and the optical effect parameter as effects metadata, wherein the processor marks the effects metadata with time information to associate the effects metadata with the recorded raw image data over time; a raw image data storage unit to record the raw image data using a sensor of the digital cinema camera, wherein the processor applies the selected optical effect to the raw image data according to the optical effects parameter to create processed image data while preserving the recorded raw image data; and a display configured to display the processed image data.

In another implementation, an apparatus for recording images is disclosed. The apparatus includes: means for receiving an optical effects selection through a user interface, wherein the optical effects selection indicates a selected optical effect to apply to raw image data capturing the images; means for storing the optical effects selection as effects metadata; means for receiving an optical effects parameter through the user interface, wherein the optical effects parameter indicates how to apply the selected optical effects to the raw image data; means for storing the optical effects parameter as effects metadata; means for recording the raw image data using a sensor; means for marking the effects metadata with time information to associate the effects metadata with the recorded raw image data over time; means for applying the selected optical effect to the raw image data according to the optical effects parameter to create processed image data while preserving the recorded raw image data; and means for displaying the processed image data.

In another implementation, a non-transitory storage medium storing a computer program to record images is disclosed. The computer program includes executable instructions that cause a computer to: receive an optical effects selection through a user interface of a digital camera, wherein the optical effects selection indicates a selected optical effect to apply to raw image data capturing the images; store the optical effects selection as effects metadata; receive an optical effects parameter through the user interface, wherein the optical effects parameter indicates how to apply the selected optical effects to the raw image data; store the optical effects parameter as effects metadata; record the raw image data using a sensor of the digital camera; mark the effects metadata with time information to associate the effects metadata with the recorded raw image data over time; apply the selected optical effect to the raw image data according to the optical effects parameter to create processed image data while preserving the recorded raw image data; and display the processed image data.

Other features and advantages of the present invention should be apparent from the present description which illustrates, by way of example, aspects of the invention.

BRIEF DESCRIPTION OF THE DRAWINGS

The details of the present invention, both as to its structure and operation, may be gleaned in part by study of the appended further drawings, in which like reference numerals refer to like parts, and in which.

DETAILED DESCRIPTION

Certain implementations as disclosed herein provide for applying optical effects while preserving raw image data in cinema production. In one implementation, a digital cinema camera captures images as raw image data. The camera can apply optical effects such as zoom or filters. However, the camera only applies the optical effects to the raw image data and shows the processed image on the camera display for review. The captured raw image data is preserved. The settings and parameters for the optical effects are recorded as metadata for the captured image data. The term optical effects as used in this application refer to visual effects such as zoom, wipe, and/or dissolve, created in the digital camera using optical and electronic equipment. After reading this description it will become apparent how to implement the invention in various implementations and applications. However, although various implementations of the present invention will be described herein, it is understood that these implementations are presented by way of example only, and not limitation. As such, this detailed description of various implementations should not be construed to limit the scope or breadth of the present invention.

Figure 1:
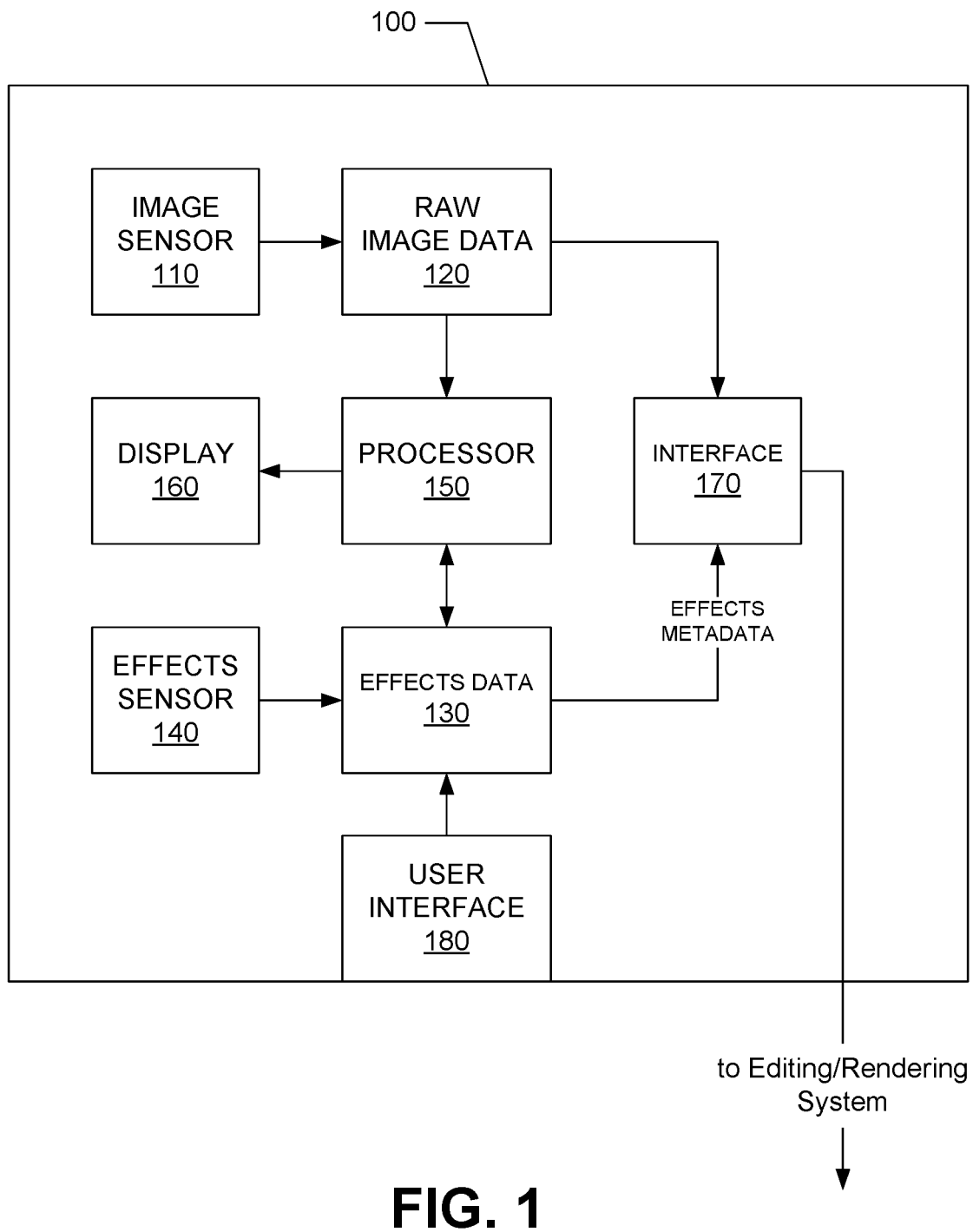
FIG. 1 is a functional block diagram illustrating an example cinema camera for applying optical effects while preserving raw image data in accordance with one implementation of the present invention.

FIG. 1 is a functional block diagram illustrating an example cinema camera 100 for applying optical effects while preserving raw image data in accordance with one implementation of the present invention. In the illustrated implementation, the cinema camera 100 includes an image sensor 110, raw image data storage 120, effects data storage 130, an effects sensor 140, a processor 150, a display 160, an interface 170, and a user interface 180. The image sensor 110 captures images as raw image data and stores the images in the raw image data storage 120. In one implementation, the effects sensor 140 captures applied effects and stores them in the effects data storage 130. In an alternative implementation, the optical effects are selected through the user interface 180 of the cinema camera 100. The settings and parameters for the optical effects are recorded as metadata for the captured raw image data. The captured raw image data and the effects metadata are packaged by the interface 170 for transport. The interface 170 then transmits the packaged data to editing and/or rendering system(s). In one implementation, the editing/rendering system applies the same effects to the raw image data using the effects metadata to create the final image data. In another implementation, the editing/rendering system applies different effects to the raw image data using the effects metadata from another source to create the final image data.

The processor 150 receives the raw image data from the raw image data storage 120 and the applied effects from the optical effects data storage 130. The processor 150 then applies the optical effects to the image data and sends the processed image data for review on the display 160 of the camera 100. In one implementation, the camera can apply optical effects such as zoom or filters. In an alternative implementation, the display 160 is configured to be a separate unit outside of the camera 100.

In the illustrated implementation of FIG. 1, the standard workflow for the effects sensor 140 to capture the applied effects and store them in the optical effects data storage 130 is to generate a look up table (LUT) which transforms the raw image data to the processed image data which can be view on a display of the camera. Thus, the LUT transforms the raw image data to an image on the display that meets the filmmaker's desires. The LUT is then transferred as metadata along with the raw images to the postproduction. Thus, in this example, the process that is moved from the time of shooting to the post production suite is the processing of the raw images to apply the optical effects.

In one implementation of a new camera system, optical effects (or functions) are applied in post-production based on metadata recorded during the image capture. A digital cinema camera uses optical effects while maintaining the capture of clean raw images. One example is applying the principles of a digital zoom (i.e., zooming beyond the limits of an optical zoom). Another example is modeling the optical filters rather than putting a physical filter in the optical path. The effect (i.e., the zoom or the filter) is viewed in the camera's display output but the process does not change the raw image that is stored and/or recorded. Instead, the effect is captured as metadata (e.g., the focal length of the digital zoom) and applied to the image in post-production.

Figure 2:
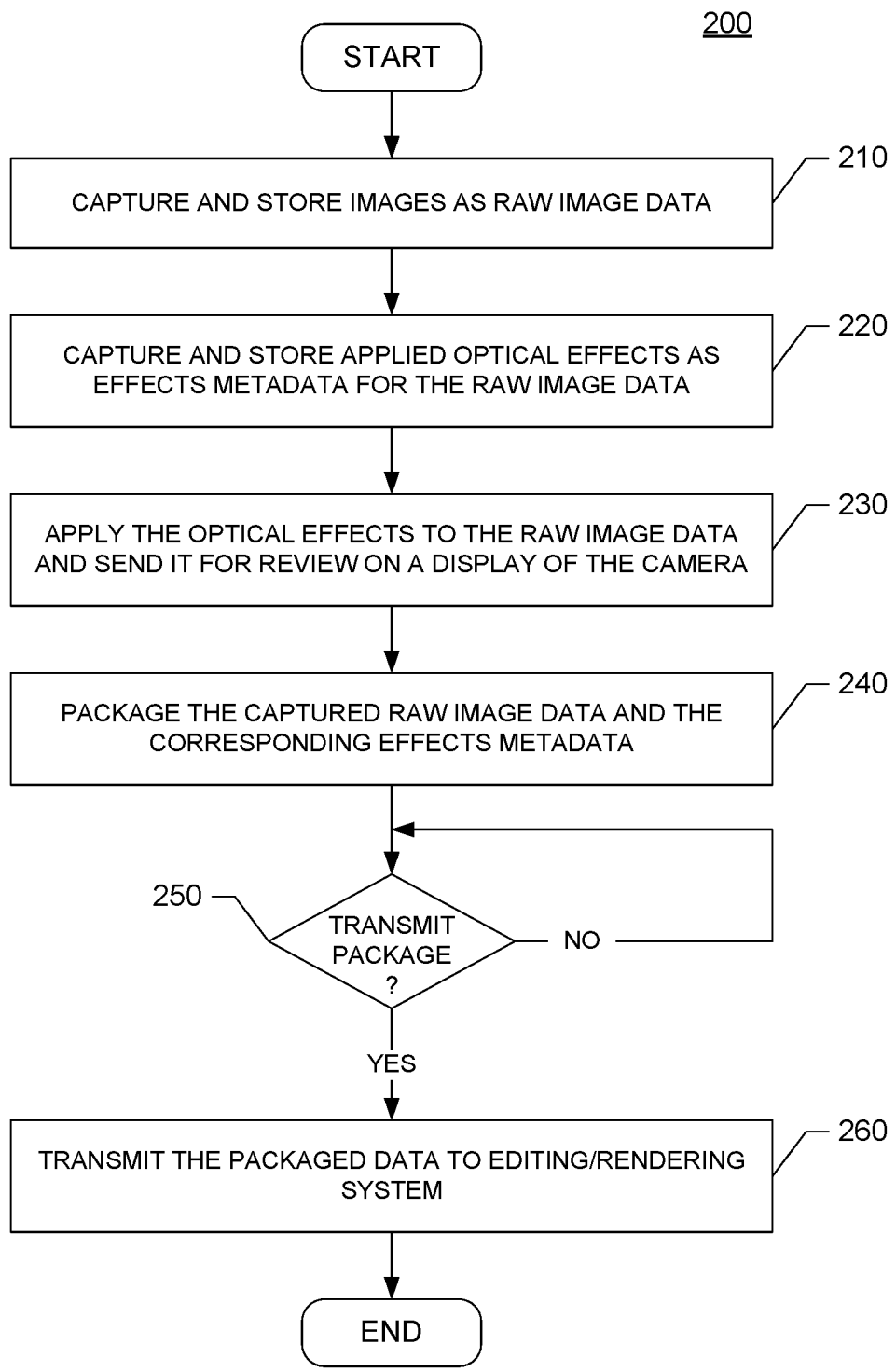
FIG. 2 is a functional flow diagram illustrating an example process 200 for applying optical effects while preserving raw image data in accordance with one implementation of the present invention.

FIG. 2 is a functional flow diagram illustrating an example process 200 for applying optical effects while preserving raw image data in accordance with one implementation of the present invention. The illustrated implementation includes, but are not limited to, one or more features such as: (1) preserving captured raw image data; (2) recording camera effects as effects metadata associated with captured raw image data; (3) displaying on the camera display, image data with camera effects applied, while preserving the captured image data; and (4) applying effects metadata to image data outside of the camera, for example, during post production.

The process 200 starts with images being captured and stored, at step 210, as raw image data. In one implementation, the applied optical effects are then captured and stored, at step 220. In an alternative implementation, the optical effects are selected through a user interface of the cinema camera. The settings and parameters for the effects are recorded as metadata for the captured raw image data. Further, an optical effects parameter is received through the user interface, wherein the optical effects parameter indicates how to apply the selected optical effects to the raw image data. The optical effects are applied to the corresponding raw image data, at step 230, and the processed image data is sent to the display of the camera for review. In an alternative implementation, the processed image data is sent to a display that is outside of the camera.

At step 240, the captured raw image data and the corresponding effects metadata are packaged for transport. The packaged data is transmitted, at step 260, when a transmit package signal is received, at step 250. In one implementation, the packaged data is transmitted to an editing/rendering system, which may apply the same effects to the raw image data using the corresponding effects metadata to create the final image data. In another implementation, the editing/rendering system applies different effects to the raw image data using the effects metadata from another source to create the final image data.

In one example use case, as broadcasters start to shoot content in 4k they are looking to cameras with Super-35 mm format sensor which are larger than the ⅔" CCD sensors in HD broadcast cameras. The larger format sensor means a larger lens, which results in several adverse consequences. For example, motion picture lenses designed to work with these cameras are much more expensive than lenses designed for HD cameras, and are much larger. Further, these lenses have a smaller zoom range which is problematic for events like sports where content producers count on a large zoom range to get into the action. Although broadcasters are adapting HD broadcast lenses and mounting them on 4k cameras the lenses cannot resolve better than HD, thus the 4k picture will be soft and possibly look no better than HD.

In another example use case, many consumer cameras have a combination of optical and digital zoom. At the limit of the optical zoom the camera switches to a digital zoom where it crops the center of the image and up-scales it. There is more detail in the center when the optical zoom is used, but no more when the digital zoom is used thus the full frame becomes softer. A digital zoom can be used on a digital cinema camera, wherein the de-mosaic is to a 6k or 8k resolution and a 4k image is to be cropped out in postproduction. There is a difference between this and digital zoom in a consumer camera. In the consumer camera, the center portion of the output of the sensor is scaled up to the output resolution and the portion of the picture that is cropped out is discarded. For the digital cinema camera, the entire image is captured and the zoomed image is extracted in post-production. If the above-described method is used in production, it is desirable for the effect of the digital zoom to be seen on set (e.g., while recording images).

In yet another example use case, the digital zoom technique can be applied to the HD display output of the camera which is used, for example, for the camera viewfinder. The camera operator operates the zoom up to the limits of the optical zoom and the system automatically switches to a digital zoom on the display output. Thus, the display output behaves like a consumer camera with a digital zoom. However, the raw image captured is the size of the image at the maximum optical zoom. The amount of digital zoom applied to the image is captured as time coded metadata allowing the digital zoom to be automatically recreated in the processed camera raw file in postproduction. This not only maintains the capture of the best possible image (the unprocessed camera raw data) but also allows all the processing to be done on systems that are not as constrained as the processing power that might be built into the camera. Furthermore, the same principle can be used for a digital pan where the crop from the final image can be moved side to side and up and down.

In yet another example use case, the filters are introduced into the optical path of a digital cinema camera. If an optical filter is used, then the effect of the filter is baked into the raw image, and there are limited options to change it later. The effect of an optical filter can, for the most part, be reproduced by image processing in post-production. However, if the optical filter is not used, the filmmaker typically has to somehow visualize how it will look and also trust that the effect will be properly applied.

In one implementation, the optical filter is replicated using processing and so the effect can be seen on a display while preserving the image data (e.g., unprocessed raw data). Using a similar process to the digital zoom, the display output of the camera is processed to replicate the effect of the optical filter so that the filmmaker can see the desired effect on the display. The parameters of the selected optical filter are recorded as metadata transmitted with the raw image to be automatically applied in post-production. Examples of optical filters that can be recreated using this technique include diffusion filters, specialized filters, and effects filters like star filters. Optical filters for which this technique may be less effective are those that are designed to bring the incident light within the range that the imager can capture, like neutral density filters.

In other implementations, additional effects, equipment, or modifications to an image can be handled similarly. For example, a light source can be emulated with an optical effect. The characteristics of the light source can be set through camera controls (e.g., position, intensity, color, etc.) The effects of the light source are applied to the image data for review on a display while the captured image data is preserved. Alternatively, an existing light source can be modified. For example, the ambient light in a scene could be modified from bright sunlight to emulate partially overcast or cloudy weather. Effects can also be introduced temporarily, such as to experiment with different effects and conditions while recording an image or scene in different ways. In yet another implementation, multiple effects can be applied in parallel for simultaneous review. For example, two images created from different levels of digital zoom or with different filters can be presented side by side for comparison (or a modified and unmodified version).

In another implementation, a second device can be used to control the application of effects. For example, a mobile device such as a smartphone or a tablet can select effects and the effect parameters. The application of the effects can be performed by the camera for output to a display (on or off the camera), by a viewing station, or by the mobile device while previewing images on the mobile device. The resulting preview image can also be provided to multiple devices for viewing (possibly at varying resolutions), such as wirelessly streaming the processed video to multiple smartphones or tablets on a set.

In another implementation, the processed image data is also preserved. For example, after applying a digital zoom to unprocessed image data, the processed image data is displayed on the camera viewfinder. The camera stores both the processed image data and the unprocessed image data and provides both sets of image data (and the metadata for the zoom effect) to a postproduction system. The processed image data and unprocessed image data may be at different resolutions as well (e.g., HD and 4k).

In another implementation, the imaging device is a medical imaging device, such as for generating MRI or x-ray images. Similar to a camera implementation, one or more optical effects (e.g., zoom, brightness, color, contrast, filters) are applied to raw image data to create processed image data for display and review. The raw image data is preserved and the applied effects are recorded as metadata. When the images are shared or reviewed later, the raw image data and metadata can be used again to present the desired processed image data. The later reviewer has access to the raw image data and can adjust the optical effects (or apply additional effects). In one example, a doctor records raw image data while applying optical effects to the raw image data, creating a set of optical effects metadata for the image data. The doctor shares the image data and metadata with another doctor for a second opinion or collaboration. The doctor can also share the image data and some or all of the metadata with others, such as an insurance provider or a patient, or store the image data and metadata in an archive. At each step, the raw image data is preserved and the effects can be reviewed and adjusted.

The foregoing methods, apparatus, and associated non-transitory storage medium are susceptible to many variations. Additionally, for clear and brief description, many descriptions of the methods, apparatus, and non-transitory storage medium have been simplified. Many descriptions use terminology and structures of specific standards. However, the disclosed methods, apparatus, and non-transitory storage medium are more broadly applicable.

Those of skill in the art will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The steps of a method or algorithm and the processes of a block or module described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules.

The above description of the disclosed implementations is provided to enable any person skilled in the art to make or use the invention. Various modifications to these implementations will be readily apparent to those skilled in the art, and the generic principles described herein can be applied to other embodiments without departing from the spirit or scope of the invention. For example, while the above examples focus on post-production use of the optical processing using metadata, the replication can be done during the production. In another example, while the above examples focus on replication of the optical processing, the optical processing using metadata can be done on the raw image data without replicating the effects metadata but using some other available effects metadata. Accordingly, the techniques are not limited to the specific examples described above. Thus, it is to be understood that the description and drawings presented herein represent a presently preferred embodiment of the invention and are therefore representative of the subject matter that is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A method for post-production replication of an optical processing for a digital camera configured to capture images, the method comprising:

receiving an optical effects selection through a user interface of a digital camera, wherein the optical effects selection indicates a selected optical effect to apply to raw image data capturing the images including at least one of zoom and filters;

storing the optical effects selection as effects metadata;

receiving an optical effects parameter through the user interface, wherein the optical effects parameter indicates how to apply the selected optical effect to the raw image data;

storing the optical effects parameter as effects metadata;

receiving an optical effects parameter through the user interface, wherein the optical effects parameter indicates how to apply the selected optical effect to the raw image data;

storing the optical effects parameter as effects metadata;

recording the raw image data using a sensor of the digital camera;

marking the effects metadata with time information to associate the effects metadata with the recorded raw image data over time;

applying the selected optical effect to the raw image data according to the optical effects parameter to create processed image data while preserving the recorded raw image data, wherein storing the optical effects selection and the optical effects parameter as the effects metadata for the recorded raw image data while preserving the recorded raw image data enables the selected optical effect to be applied according to the optical effects parameter to the raw image data, post production; and displaying the processed image data.

2. The method of claim 1, further comprising storing the effects metadata and the recorded raw image data on removable storage coupled to the digital camera.

3. The method of claim 2, further comprising applying the effects metadata to the recorded raw image data using an editing computer system, separate from the digital camera.

4. The method of claim 1, wherein the zoom includes a digital zoom which provides zooming beyond limits of an optical zoom.

5. The method of claim 4, wherein the effects metadata of the digital zoom is stored as a focal length of the digital zoom.

6. The method of claim 4, further comprising cropping and up-scaling each image of the images at a boundary between the optical zoom and the digital zoom.

7. The method of claim 1, wherein the filters include optical filters rather than a physical filter in an optical path.

8. The method of claim 7, wherein the optical filters include at least one of diffusion filters, specialized filters, and star filters.

9. The method of claim 1, wherein the selected optical effect includes a light source.

10. The method of claim 9, wherein the light source is emulated with the selected optical effect by setting characteristics of the light source within the images, the characteristics including at least one of position, intensity, and color of the light source.

11. A digital cinema camera for post-production replication of an optical processing, the digital cinema camera comprising:

an effects sensor configured to capture an optical effects of the digital cinema camera, wherein the optical effects are applied to raw image data capturing the images including at least one of zoom and filters;

a processor configured to receive an optical effects parameter, wherein the optical effects parameter indicates how to apply the optical effects to the raw image data;

an optical effects data storage unit to store the optical effects and the optical effects parameter as effects metadata, wherein the processor marks the effects metadata with time information to associate the effects metadata with the recorded raw image data over time;

a raw image data storage unit to record the raw image data using a sensor of the digital cinema camera, wherein the processor applies the selected optical effect to the raw image data according to the optical effects parameter to create processed image data while preserving the recorded raw image data, wherein storing the optical effects and the optical effects parameter as the effects metadata for the recorded raw image data in the optical effects data storage unit while preserving the recorded raw image data in the raw image data storage unit enables the selected optical effect to be applied according to the optical effects parameter to the raw image data, post production; and a display configured to display the processed image data.

12. The digital cinema camera of claim 11, further comprising a removable storage unit coupled to the digital cinema camera and configured to store the effects metadata and the recorded raw image data.

13. The digital cinema camera of claim 12, further comprising an editing computer system, separate from the digital cinema camera, the editing computer system configured to apply the effects metadata to the recorded raw image data.

14. The digital cinema camera of claim 11, wherein the zoom includes a digital zoom which provides zooming beyond limits of an optical zoom.

15. The digital cinema camera of claim 14, wherein the effects metadata of the digital zoom is stored as a focal length of the digital zoom.

16. The digital cinema camera of claim 14, wherein the processor is configured to crop and up-scale each image of the images at a boundary between the optical zoom and the digital zoom.

17. The digital cinema camera of claim 11, wherein the filters include optical filters rather than a physical filter in an optical path.

18. The digital cinema camera of claim 17, wherein the optical filters include at least one of diffusion filters, specialized filters, and star filters.

19. The digital cinema camera of claim 11, wherein the selected optical effect includes a light source.

20. The digital cinema camera of claim 19, wherein the light source is emulated with the optical effect by setting characteristics of the light source within the images, the characteristics including at least one of position, intensity, and color of the light source.

* * * * *